(12) United States Patent
Hanks et al.

(10) Patent No.: US 8,994,511 B2
(45) Date of Patent: Mar. 31, 2015

(54) ELECTRONIC IDENTIFICATION PACKAGE

(75) Inventors: Carl J. Hanks, Saint Louis, MO (US); James W. Fonda, Moscow Mills, MO (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 13/229,767

(22) Filed: Sep. 12, 2011

(65) Prior Publication Data
US 2013/0063254 A1 Mar. 14, 2013

(51) Int. Cl.
H04Q 5/22 (2006.01)
G06K 19/077 (2006.01)
G06K 19/04 (2006.01)

(52) U.S. Cl.
CPC .......... G06K 19/07743 (2013.01); G06K 19/04 (2013.01)
USPC .................... 340/10.42; 340/10.1; 340/10.52; 340/12.51; 340/12.55; 340/13.26; 340/12.5; 340/571.1; 340/572.1

(58) Field of Classification Search
USPC ...................................................... 340/10.42
See application file for complete search history.

(56) References Cited

U.S. PATENT DOCUMENTS

| | | | | |
|---|---|---|---|---|
| 7,839,285 | B2* | 11/2010 | Tuttle | 340/572.1 |
| 2003/0084440 | A1* | 5/2003 | Lownes | 725/6 |
| 2005/0136949 | A1* | 6/2005 | Barnes, Jr. | 455/461 |
| 2006/0073735 | A1* | 4/2006 | Valcher et al. | 439/607 |
| 2006/0248345 | A1* | 11/2006 | Ishidera | 713/183 |
| 2007/0229268 | A1* | 10/2007 | Swan et al. | 340/572.1 |
| 2009/0027204 | A1* | 1/2009 | Fujimaki et al. | 340/572.1 |

OTHER PUBLICATIONS

International Search Report and Written Opinion mailed on Nov. 21, 2012 for PCT Application No. PCT/US2012/049780 international filing date Aug. 6, 2012—International Search Authority—European Patent Office.

Dallas Semiconductor—DS1971, 256-Bit EEPROM iButton, pp. 1-3, Announcement Dallas Semiconductor, Aug. 20, 1999, pp. 1-3, XP002974491, the whole document.

http://www.maxim-ic.com/products/1-wire/ Accessed Nov. 27, 2012.

* cited by examiner

*Primary Examiner* — Kerri McNally
*Assistant Examiner* — Anthony D Afrifa-Kyei
(74) *Attorney, Agent, or Firm* — Ameh IP; Elahe Toosi; Lowell Campbell

(57) ABSTRACT

An electronic identification package and methods are disclosed. The electronic identification package comprises an electronic identifier operable to provide an identification. A ground conductive contact is coupled to the electronic identifier and is operable to conductively couple to a conductive body. An insulator is operable to insulate the electronic identifier from the conductive body, and a reader conductive contact is coupled to the electronic identifier and is operable to electronically couple to an electronic identification reader.

20 Claims, 4 Drawing Sheets

ELECTRONIC IDENTIFICATION PACKAGE

FIELD

Embodiments of the present disclosure relate generally to identification systems. More particularly, embodiments of the present disclosure relate to electronic identification systems.

BACKGROUND

It is often necessary to be able to uniquely identify objects such as aircraft parts and auto parts. For example, an identifier can ensure a correct part is inserted in a machine, and allow tracking of a location of the part. Traditional approaches such as a barcode or a radio frequency identification (RFID) device may not work because of harsh environments and/or because of a size of the barcode or the radio frequency identification (RFID) device.

SUMMARY

An electronic identification package and methods are disclosed. The electronic identification package comprises an electronic identifier operable to provide an electronic identification. A ground conductive contact is coupled to the electronic identifier and is operable to conductively couple to a conductive body. An insulator is operable to insulate the electronic identifier from the conductive body. A reader conductive contact is coupled to the electronic identifier and is operable to electronically couple to an electronic identification reader.

The electronic identification package provides a means for identifying an object comprising a conductive body by drilling a drill hole (producing a drilled hole) in the conductive body, placing the electronic identification package in the drilled hole, and coupling the electronic identification package to the conductive body using a conductive coupling. For example, embodiments provide a readable unique electronic identification package which can be used to ensure a correct tool is inserted in a machine and can track a usage of the correct tool.

In an embodiment, an electronic identification package comprises an electronic identifier, a ground conductive contact, an insulator, and a reader conductive contact. The electronic identifier is operable to provide an identification. The ground conductive contact is coupled to the electronic identifier and is operable to conductively couple to a conductive body. The insulator is operable to insulate the electronic identifier from the conductive body. The reader conductive contact is coupled to the electronic identifier and is operable to electronically couple to an electronic identification reader.

In another embodiment, a method for providing an electronic identification package provides an electronic identifier operable to provide an identification. The method further provides a ground conductive contact coupled to the electronic identifier and operable to conductively couple to a conductive body. The method also provides an insulator operable to insulate the electronic identifier from the conductive body. Additionally, the method provides a reader conductive contact coupled to the electronic identifier and operable to electronically couple to an electronic identification reader.

In yet another embodiment, a method for identifying a conductive body, provides an electronic identification capsule comprising an electronic identifier operable to provide an identification, and a ground conductive contact and a reader conductive contact coupled to the electronic identifier. The method further embeds the electronic identification capsule in the conductive body and couples the ground conductive contact to the conductive body using a conductive coupling. The method further, communicatively couples the reader conductive contact to an electronic identifier reader. The method then reads an identification information of the conductive body from the electronic identifier by the electronic identifier reader.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
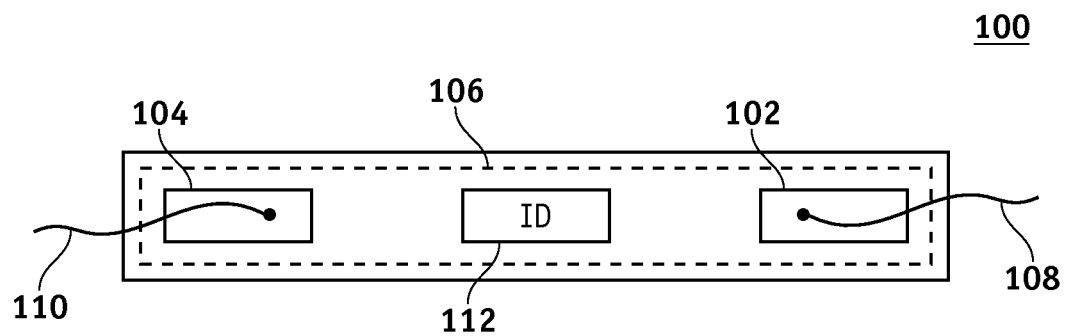
FIG. 1 is an illustration of an exemplary electronic identifier according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electronics, data communication, electronic packaging, manufacturing, (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, drill bit identification. Embodiments of the disclosure, however, are not limited to such drill bit applications, and the techniques described herein may also be utilized in other conductive objects. For example but without limitation, embodiments may be applicable to identifying a manufacturing tool, an auto part, an aircraft part, a bullet, an explosive, an artillery shell, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Many identification systems can be difficult to use and/or unreliable. For example, some identification systems provide barcodes that may wear off and become unreadable. For another example, laser etching may not be possible because laser etching may not be easily visible on Tungsten Carbide. Furthermore, a tag embedded in metal may be difficult to read. Generally, wired and wireless electronic identification systems are not designed to be embedded inside an object, but instead reside on a surface thereof. For example, an RFID tag generally cannot be attached to a side of a drill bit because the RFID tag could cause balance issues, and might be too big or could be easily broken off.

In contrast, embodiments of the disclosure provide an electronic identification package embedded and readable inside a conductive body. Since the electronic identification package can be implanted flush with a surface of the conductive body, the electronic identification package is not susceptible to being broken off or worn off like an RFID chip or a barcode. Embodiments of the disclosure provide a design and simple interface, wherein a reader conductive contact of the electronic identification package described herein can be integrated directly into a conductive body such as a chuck end of a drill bit.

FIG. 1 is an illustration of an exemplary electronic identifier 100 according to an embodiment of the disclosure. The electronic identifier 100 comprises a first electronic identifier contact 102, a second electronic identifier contact 104, and an electronic circuit 106. The electronic identifier 100 may comprise, for example but without limitation, a memory, a read only memory (ROM), a serial number, a cyclic redundancy code (CRC), an at least a 64-bit ROM comprising at least a unique 48-bit serial number, an at least 8-bit cyclic code redundancy (CRC), and the like.

Figure 2:
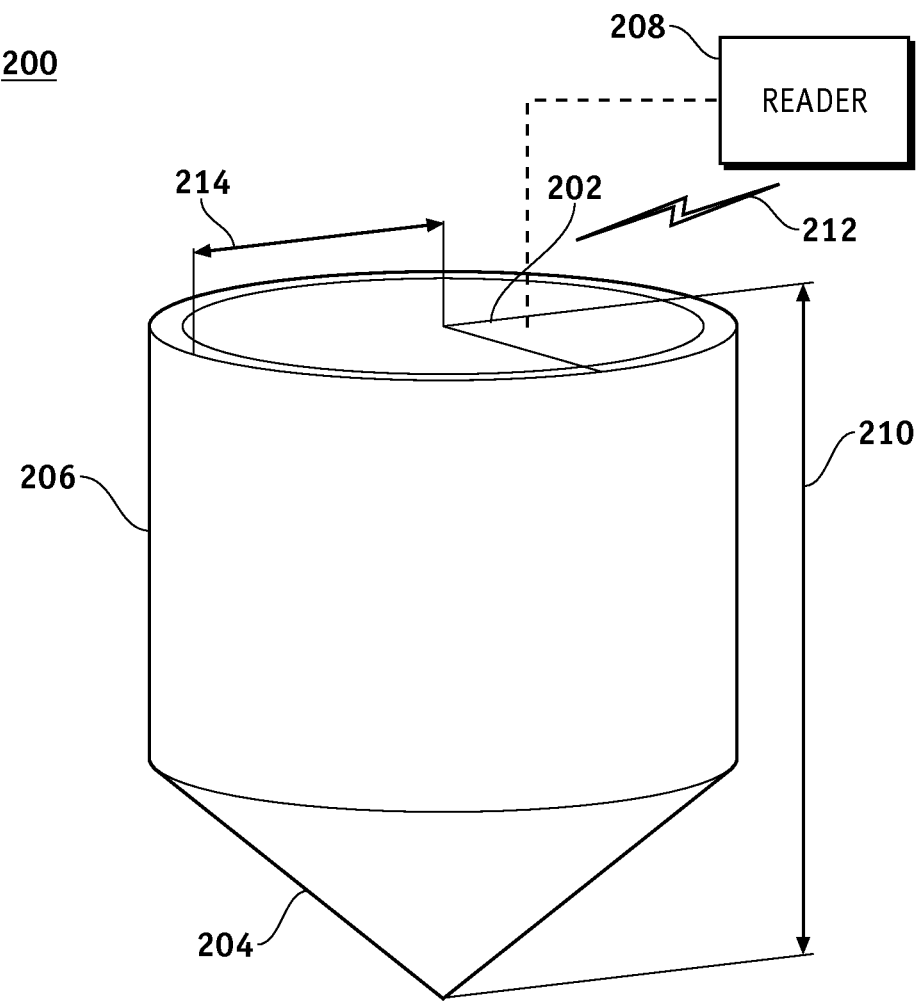
FIG. 2 is an illustration of the exemplary electronic identification package comprising the electronic identifier of FIG. 1.

The first electronic identifier contact 102 is coupled to a reader conductive contact 202 (FIG. 2). For example, the first electronic identifier contact 102 may be coupled to the reader conductive contact 202 by a bond wire 108. The first electronic identifier contact 102 is operable to electronically couple to an electronic identification reader 208 (FIG. 2) via the reader conductive contact 202.

The second electronic identifier contact 104 is coupled to a ground conductive contact 204 (FIG. 2). For example, the second electronic identifier contact 104 may be coupled to the ground conductive contact 204 by a bond wire 110. The second electronic identifier contact 104 is operable to electronically couple to a conductive body 304 (FIG. 3) via the ground conductive contact 204.

The electronic circuit 106 is configured to provide an electronic identification information (ID) 112 via the reader conductive contact 202. The electronic circuit 106 may comprise, for example but without limitation, a microelectronic circuit, a VLSI chip, a semiconductor circuit, and the like. The ID 112 may comprise, for example but without limitation, an identification code.

FIG. 2 is an illustration of the exemplary electronic identification package 200 comprising the electronic identifier 100 of FIG. 1. The electronic identification package 200 comprises the electronic identifier 100 (FIGS. 1 and 3), the reader conductive contact 202, the ground conductive contact 204, and an insulator 206. As shown in FIG. 2, the electronic identification package 200 may comprise a conical-shape-ended cylinder comprising, for example but without limitation, a radius 214 of about 2 mm to about 2.2 mm and a depth 210 of about 4.7 mm to about 4.9 mm, and the like. However other shapes and sizes may also be used.

The reader conductive contact 202 is configured to electronically couple to the electronic identification reader 208. The reader conductive contact 202 is further configured to provide electronic signals 212 to the electronic identification reader 208 for identification of the electronic identifier 100. Identification of the electronic identifier 100 can be used to identify an object comprising a conductive body 304 (FIG. 3) to which the electronic identification package 200 is coupled.

The insulator 206 is configured to insulate the ground conductive contact 204 from the reader conductive contact 202. The insulator 206 further insulates the electronic identifier 100 from the conductive body 304 to which the electronic identification package 200 is coupled. The insulator 206 may comprise a surface, or may fill an interior 310 (FIG. 3) of the electronic identification package 200. The insulator 206 may comprise, for example but without limitation, epoxy, plastic, ceramics, polytetrafluoroethylene (PTFE, Teflon), glass, fiberglass, thermoplastics, acrylic, polymide (Kapton), or any other electrical insulator. Insulator 206 may even comprise a gap filled with a gas or a gap with a vacuum.

The electronic identification reader 208 is electronically coupled to the reader conductive contact 202 and is configured to read the ID 112 from the electronic circuit 106 of the electronic identifier 100. The ID 112 may be stored in the electronic identification reader 208 and used for tracking the conductive body 304.

For example, by reading the ID 112 of the conductive body 304 from the electronic identifier 100 by the electronic identification reader 208, a machine can be programmed to ensure that a proper drill bit is inserted in a drill before performing any work. Proper identification of the proper drill bit can reduce costly rework that is sometimes caused by an operator that may be using a wrong bit to manufacture a part. Additionally, a unique ID 112 can be used for life tracking of the drill bit. Life tracking of the drill bit can ensure that bits are sharpened at needed intervals and are not used beyond an expected life of the drill bit. Therefore, potential damage caused to parts by using bits that are dull or bits that are beyond a specified life and may not be optimal during manufacturing, can be reduced. Also, the unique ID 112 can be used to provide better inventory tracking of bits on hand. Better inventory tracking can reduce over-ordering of unneeded parts or eliminate costly rush ordering.

A drill bit is used as an example of a conductive body that can be identified by the electronic identification package 200. However, the electronic identification package 200 may be embedded in various tools and parts such as, but without limitation, those mentioned above for tracking and checking for proper tool insertion, and the like.

Figure 3:
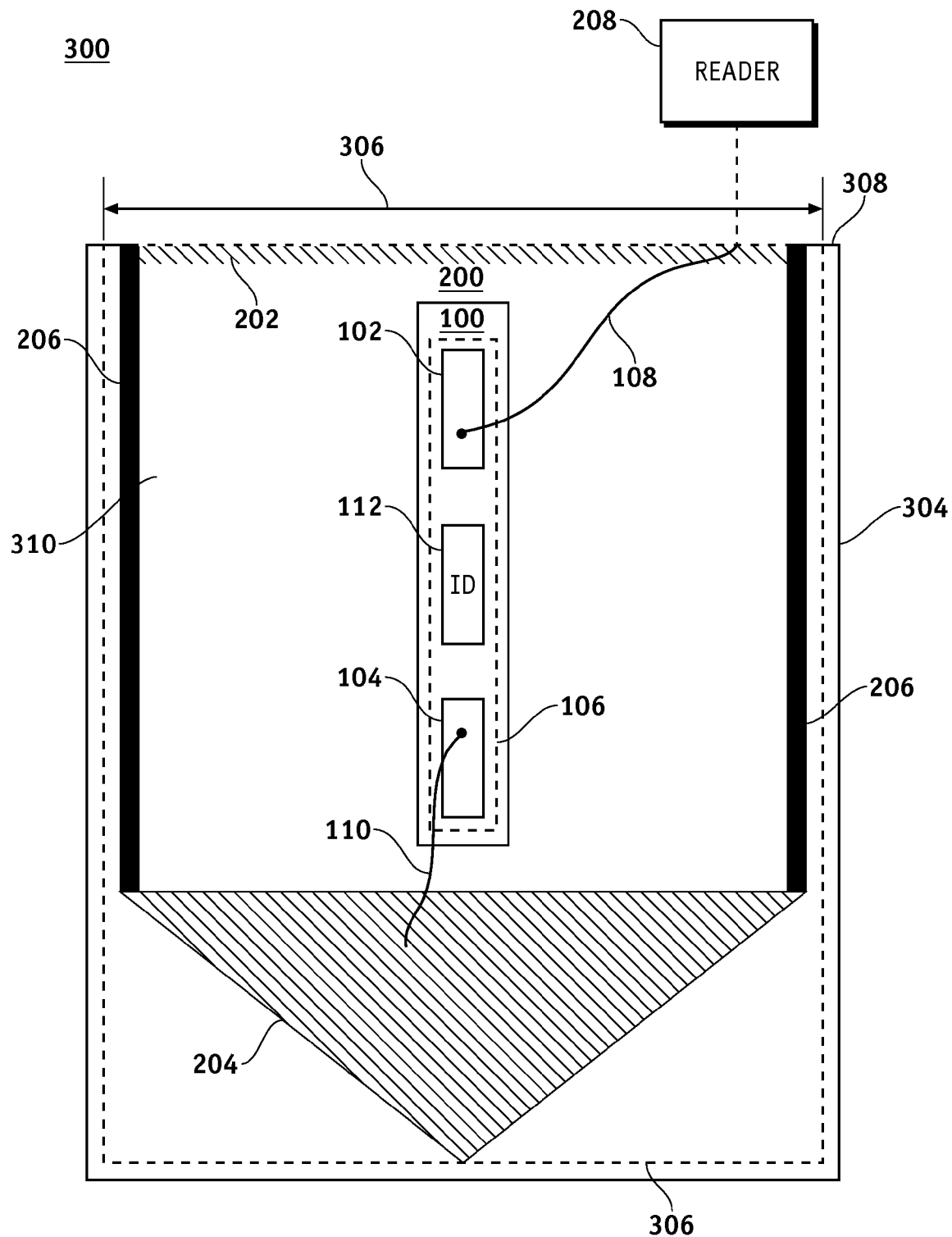
FIG. 3 is an illustration of an electronic identification system showing a cross section of an exemplary conductive body comprising the exemplary electronic identification package of FIG. 2 embedded therein according to an embodiment of the disclosure.

FIG. 3 is an illustration of an electronic identification system 300 (system 300) showing a cross section of the conductive body 304 comprising the electronic identification package 200 of FIG. 2 embedded therein according to an embodiment of the disclosure. The embodiment shown in FIG. 3 may have functions, material, and structures that are similar to the embodiment shown in FIGS. 1-2. Therefore, common features, functions, and elements may not be redundantly described here. The system 300 comprises the conductive body 304, the electronic identification package 200, and the electronic identification reader 208.

The conductive body 304 may comprise, for example but without limitation, a drill bit, a cutting tool, a manufacturing tool, an auto part, an aircraft part, a bullet, an explosive, an artillery shell, a metal, alloys, tungsten carbide, silicon carbide, and the like. The conductive body 304 may be identified by the ID 112.

The conductive body 304 comprises a cavity 306. The cavity 306 is sized suitable for embedding the electronic identification package 200 therein, and the cavity 306 may be sized according to the depth 210 and the radius 214 of the electronic identification package 200. The cavity 306 may be, for example but without limitation, carved, drilled, and the like into the conductive body 304. The electronic identification package 200 is then placed in the cavity 306, and the insulator 206 is then cured.

The reader conductive contact 202 is aligned flush with a surface 308 of the conductive body 304. The ground conductive contact 204 is conductively coupled to the conductive body 304. The insulator 206 insulates the reader conductive contact 202 and the electronic identification package 200 from the conductive body 304.

Figure 4:
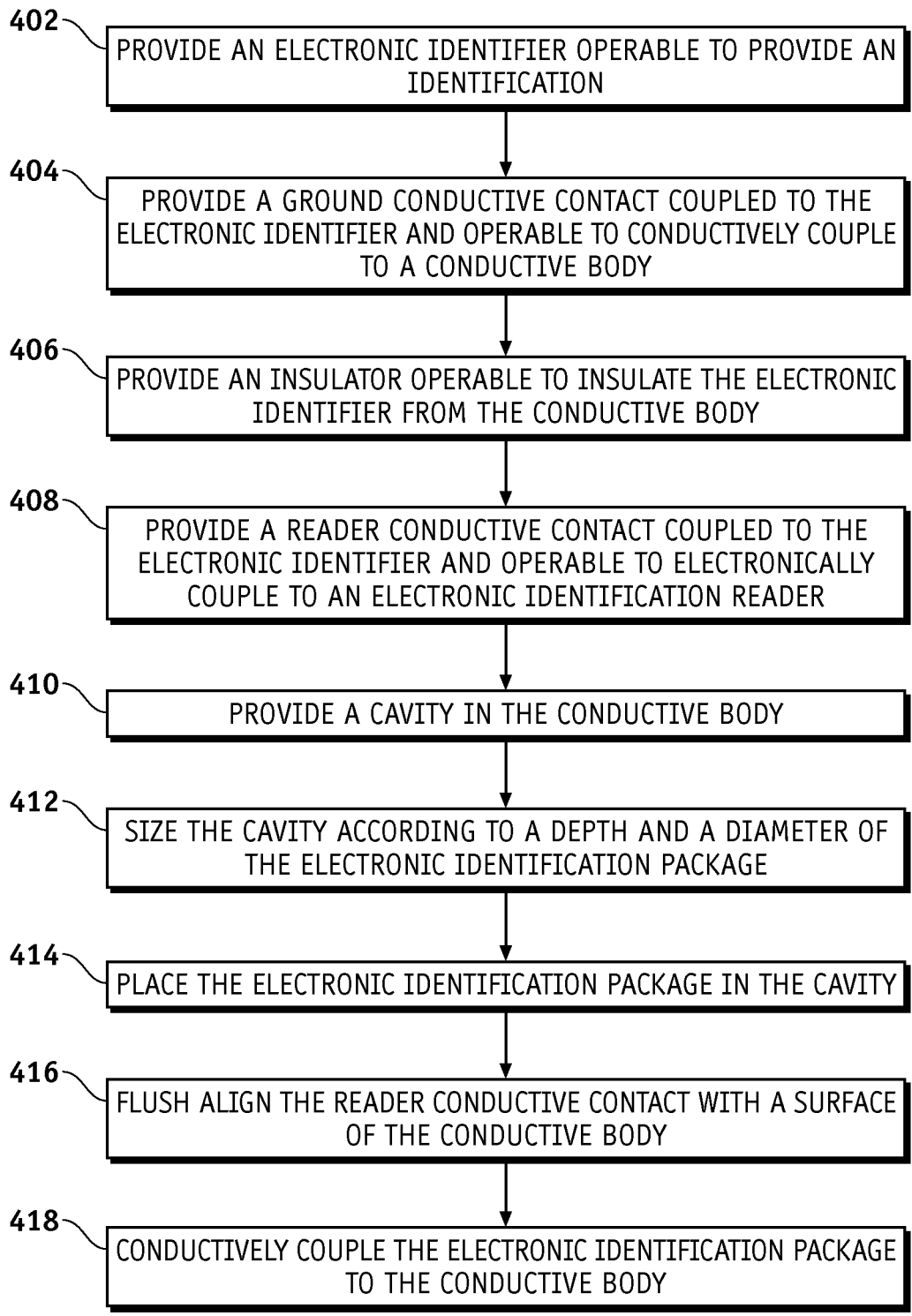
FIG. 4 is an illustration of an exemplary process for providing an electronic identification package according to an embodiment of the disclosure.

FIG. 4 is an illustration of an exemplary process for providing the electronic identification package 200 according to an embodiment of the disclosure. The various tasks performed in connection with the process 400 may be performed mechanically, by software, hardware, firmware, a computer-readable medium having computer executable instructions for performing the processes methods, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein. For illustrative purposes, the following description of the process 400 may refer to elements mentioned above in connection with FIGS. 1-3.

In practical embodiments, portions of the process 400 may be performed by different elements of the system 300 such as: the conductive body 304, the electronic identification package 200, and the electronic identification reader 208 etc. Process 400 may have functions, material, and structures that are similar to the embodiments shown in FIGS. 1-3. Therefore, common features, functions, and elements may not be redundantly described here.

Process 400 may begin by providing an electronic identifier such as the electronic identifier 100 configured to provide an identification such as the identification information (ID) 112 (task 402).

Process 400 may continue by providing a ground conductive contact such as the ground conductive contact 204 coupled to the electronic identifier 100 and configured to conductively couple to a conductive body such as the conductive body 304 (task 404).

Process 400 may then continue by providing an insulator such as the insulator 206 configured to insulate the electronic identifier 100 from the conductive body 304 (task 406).

Process 400 may then continue by providing a reader conductive contact such as the reader conductive contact 202 coupled to the electronic identifier 100 and configured to electronically couple to an electronic identification reader such as the electronic identification reader 208 (task 408).

Process 400 may then continue by providing a cavity such as the cavity 306 in the conductive body 304 (task 410).

Process 400 may then continue by sizing the cavity 306 according to a depth 210 and a radius 214 (or diameter) of the electronic identification package such as the electronic identification package 200 (task 412).

Process 400 may then continue by placing the electronic identification package 200 in the cavity 306 (task 414).

Process 400 may then continue by flush aligning the reader conductive contact 202 with a surface such as the surface 308 of the conductive body 304 (task 416).

Process 400 may then continue by conductively coupling the electronic identification package 200 to the conductive body 304 (task 418).

Figure 5:
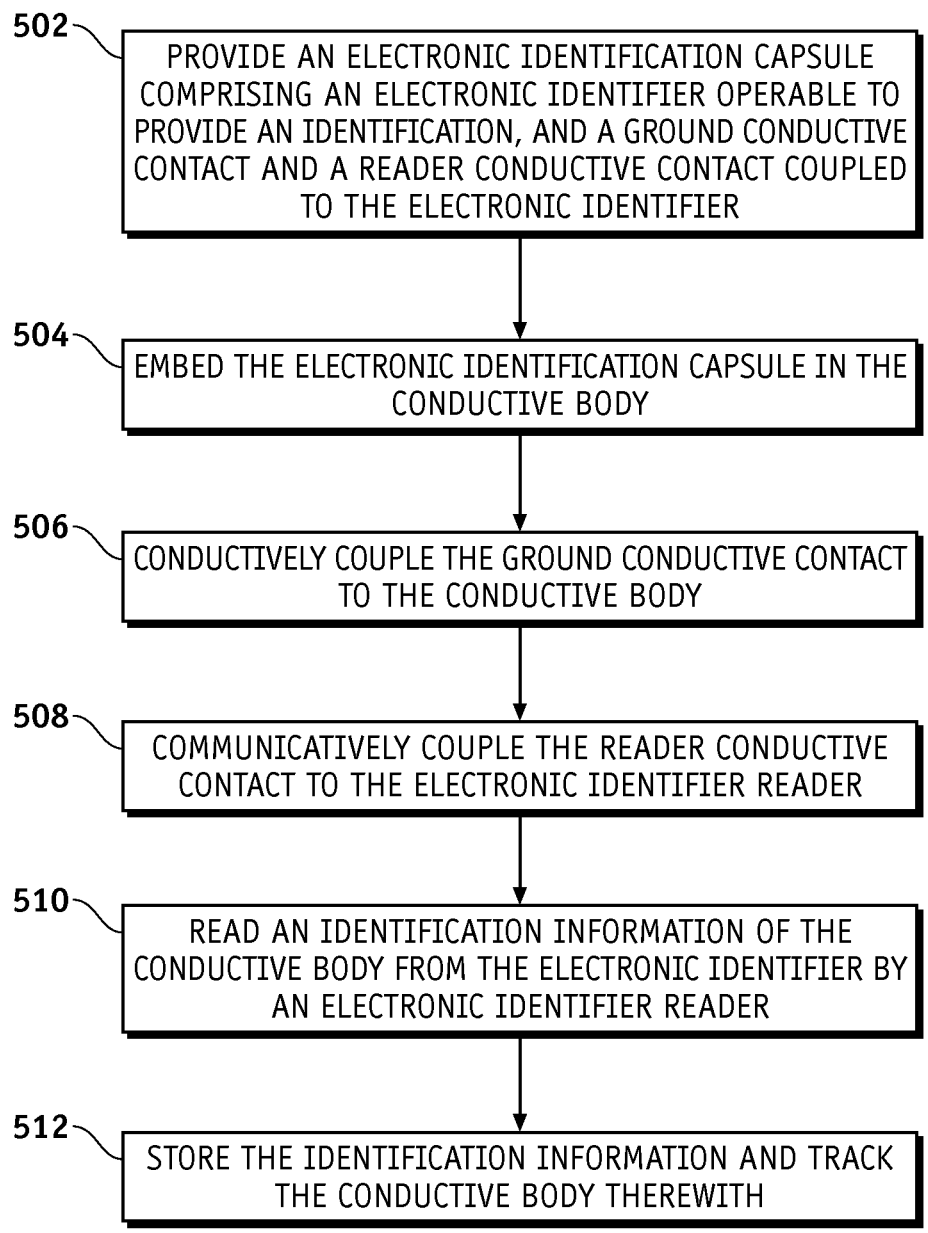
FIG. 5 is an illustration of an exemplary process for using the electronic identification package according to an embodiment of the disclosure.

FIG. 5 is an illustration of an exemplary process for using the electronic identification package 200 according to an embodiment of the disclosure. The various tasks performed in connection with the process 500 may be performed mechanically, by software, hardware, firmware, a computer-readable medium having computer executable instructions for performing the processes methods, or any combination thereof.

It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein. For illustrative purposes, the following description of the process 500 may refer to elements mentioned above in connection with FIGS. 1-3.

In practical embodiments, portions of the process 500 may be performed by different elements of the system 300 such as: the conductive body 304, the electronic identification package 200, and the electronic identification reader 208 etc. Process 500 may have functions, material, and structures that are similar to the embodiments shown in FIGS. 1-3. Therefore, common features, functions, and elements may not be redundantly described here.

Process 500 may begin by providing an electronic identification capsule such as the electronic identification package 200 comprising an electronic identifier such as the electronic identifier 100 configured to provide an identification such as the ID 112, and a ground conductive contact and a reader conductive contact such as the ground conductive contact 204 and the reader conductive contact 202 coupled to the electronic identifier 100 (task 502). In this document, an electronic identification capsule 200 and an electronic identification package 200 may be used interchangeably.

Process 500 may then continue by embedding the electronic identification capsule 200 in a conductive body such as the conductive body 304 (task 504).

Process 500 may then continue by conductively coupling the ground conductive contact 204 to the conductive body 304 (task 506).

Process 500 may then continue by communicatively coupling the reader conductive contact 202 to an electronic identifier reader such as the electronic identification reader 208 (task 508). In this document, electronic identifier reader and electronic identification reader may be used interchangeably.

Process 500 may then continue by reading an identification information such as the ID 112 of the conductive body 304 from the electronic identifier 100 by the electronic identifier reader such as the electronic identification reader 208 (task 510). In this document, identification and identification information may be used interchangeably.

Process 500 may then continue by storing the identification information 112 and tracking the conductive body 304 therewith (task 512).

In this way, an identification system is provided for identification of an object comprising a conductive body. The identification system provides a means for identifying an object comprising a conductive body by drilling a drill hole (producing a drilled hole) in the conductive body, placing the electronic identification package in the drilled hole, and coupling the electronic identification package to the conductive body using a conductive coupling.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An electronic identification package comprising:
an electronic identifier operable to provide an identification of a conductive body;
a ground conductive contact comprising a conical shape and coupled to the electronic identifier and operable to mechanically contact and electrically connect to the conductive body;
an insulator operable to enclose and insulate the electronic identifier from the conductive body, the insulator comprising a cylindrical shape and coupled to the ground conductive contact at a first end of the insulator, the conical shape of the ground conductive contact and the cylindrical shape of the insulator together forming the electronic identification package into a conical-shape-ended cylinder configured to fit and embed inside a cylindrical cavity of the conductive body; and
a reader conductive contact coupled to the electronic identifier and operable to mechanically contact and electronically couple to an electronic identification reader, the reader conductive contact configured at a second end of the insulator opposite to the ground conductive contact.

2. The electronic identification package of claim 1, wherein the electronic identification package is located in the cylindrical cavity in the conductive body.

3. The electronic identification package of claim 2, wherein the cylindrical cavity is sized according to a depth and a diameter of the electronic identification package.

4. The electronic identification package of claim 1, wherein the conductive body comprises at least one member selected from the group consisting of: a metal, an alloy, tungsten carbide, and silicon carbide.

5. The electronic identification package of claim 1, wherein the insulator comprises at least one member selected from the group consisting of: epoxy, plastic, ceramics, polytetrafluoroethylene (PTFE, Teflon), glass, fiberglass, thermoplastics, acrylic, a gap filled with a gas, a gap with a vacuum, and polymide (Kapton).

6. The electronic identification package of claim 1, wherein the electronic identifier comprises a read only memory (ROM), a serial number, and a cyclic redundancy code (CRC).

7. A method for providing an electronic identification package, the method comprising:
providing an electronic identifier operable to provide an identification of a conductive body;

providing a ground conductive contact comprising a conical shape and coupled to the electronic identifier and operable to mechanically contact and electrically connect to the conductive body;

providing an insulator operable to enclose and insulate the electronic identifier from the conductive body, the insulator comprising a cylindrical shape and coupled to the ground conductive contact at a first end of the insulator, the conical shape of the ground conductive contact and the cylindrical shape of the insulator together forming the electronic identification package into a conical-shape-ended cylinder configured to fit and embed inside a cylindrical cavity of the conductive body; and providing a reader conductive contact coupled to the electronic identifier and operable to mechanically contact and electronically couple to an electronic identification reader, the reader conductive contact configured at a second end of the insulator opposite to the ground conductive contact.

8. The method of claim 7, further comprising:
providing the cylindrical cavity in the conductive body;
placing the electronic identification package in the cylindrical cavity; and
conductively coupling the electronic identification package to the conductive body.

9. The method of claim 8, further comprising flush aligning the reader conductive contact with a surface of the conductive body.

10. The method of claim 8, further comprising sizing the cylindrical cavity according to a depth and a diameter of the electronic identification package.

11. The method of claim 7, wherein the conductive body comprises at least one member selected from the group consisting of: a manufacturing tool, an auto part, an aircraft part, a bullet, an explosive, and an artillery shell.

12. The method of claim 7, wherein the conductive body comprises at least one member selected from the group consisting of: a metal, an alloy, tungsten carbide, and silicon carbide.

13. The method of claim 7, wherein the insulator comprises at least one member selected from the group consisting of: epoxy, plastic, ceramics, polytetrafluoroethylene (PTFE, Teflon), glass, fiberglass, thermoplastics, acrylic, a gap filled with a gas, a gap with a vacuum, and polymide (Kapton).

14. The method of claim 7, wherein the electronic identifier comprises a read only memory (ROM), a serial number and a cyclic redundancy code (CRC).

15. A method for identifying a conductive body, the method comprising:
providing an electronic identification capsule comprising:
an electronic identifier operable to provide identification information of a conductive body;
a ground conductive contact comprising a conical shape and coupled to the electronic identifier;
an insulator operable to enclose and insulate the electronic identifier from the conductive body, the insulator comprising a cylindrical shape and coupled to the ground conductive contact at a first end of the insulator, the conical shape of the ground conductive contact and the cylindrical shape of the insulator together forming the electronic identification capsule into a conical-shape-ended cylinder configured to fit and embed inside a cylindrical cavity of the conductive body; and
a reader conductive contact coupled to the electronic identifier, the reader conductive contact configured at a second end of the insulator opposite to the ground conductive contact;
embedding the electronic identification capsule in the conductive body;
coupling the ground conductive contact mechanically and electrically to the conductive body;
communicatively coupling the reader conductive contact mechanically and electronically to an electronic identifier reader; and
reading the identification information of the conductive body from the electronic identifier by the electronic identifier reader.

16. The method of claim 15, further comprising storing the identification information and tracking the conductive body therewith.

17. The method of claim 15, wherein the conductive body comprises at least one member selected from the group consisting of: a manufacturing tool, an auto part, an aircraft part, a bullet, an explosive, and an artillery shell.

18. The method of claim 15, wherein the conductive body comprises at least one member selected from the group consisting of: a metal, an alloy, tungsten carbide, and silicon carbide.

19. The method of claim 15, wherein the step of embedding comprises:
providing the cylindrical cavity in the conductive body;
placing the electronic identification capsule in the cylindrical cavity; and
conductively coupling the electronic identification capsule to the conductive body.

20. The method of claim 11, wherein the manufacturing tool comprises a drill bit comprising a chuck end, wherein the electronic identification package is embedded in the chuck end.

* * * * *